H. M. SIMPSON.
AIR FILTER FOR BOTTLES.
APPLICATION FILED JULY 20, 1922.
1,436,917.
Patented Nov. 28, 1922.
2 SHEETS—SHEET 1.
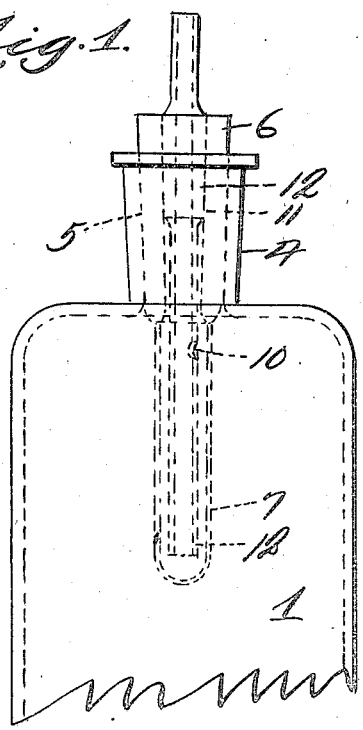
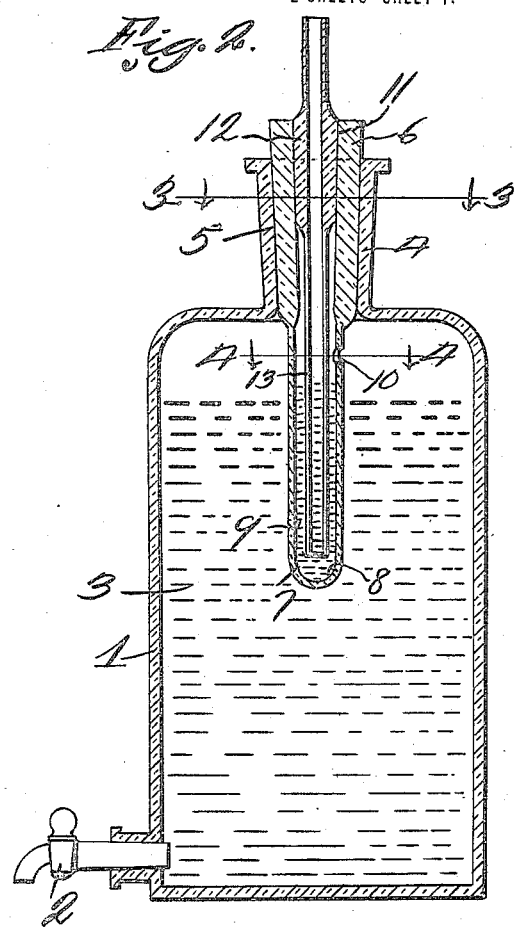
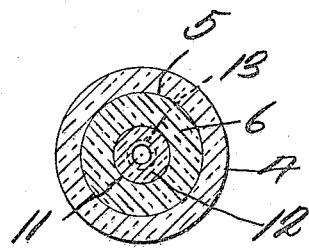
Inventor
Harlowe M. Simpson
By _____ Attorney

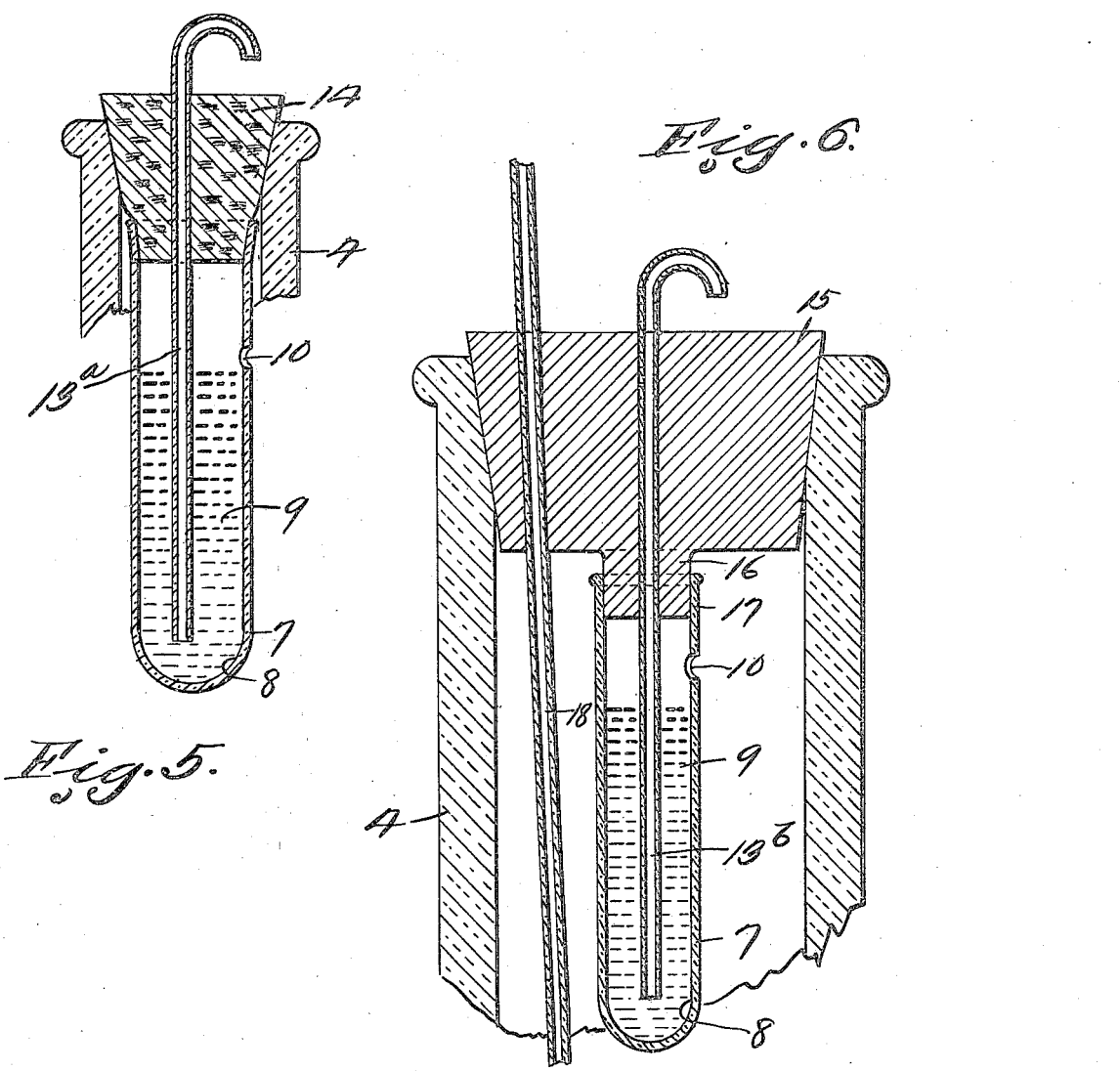

Patented Nov. 28, 1922.

1,436,917

UNITED STATES PATENT OFFICE.

HARLOWE M. SIMPSON, OF FORT MORGAN, COLORADO.

AIR FILTER FOR BOTTLES.

Application filed July 20, 1922. Serial No. 576,190.

*To all whom it may concern:*

Be it known that HARLOWE M. SIMPSON, citizen of the United States, residing at Fort Morgan, in the county of Morgan and State of Colorado, has invented certain new and useful Improvements in Air Filters for Bottles, of which the following is a specification, reference being had therein to the accompanying drawings.

The invention relates to air filters for bottles and has for its object to provide in combination with a stopper, a downwardly extending casing having a chamber therein, in which a filtering liquid may be placed, the stopper being provided with an air pipe extending through the stopper and down into the chamber into the liquid, and through which pipe air passes, is filtered by the liquid and then passes through an aperture in the casing to the chamber of the bottle. The air is taken in as the liquid within the bottle is displaced. It has been found that a great many liquids in a laboratory deteriorate or become contaminated by contact with the air. The chamber of the casing may receive distilled water, or acid with which the bottle is filled and all air entering will be filtered through the liquid before it comes into contact with the contents of the bottle.

A further object is to provide a glass stopper having an integral downwardly extending casing forming a chamber for the reception of liquid and an auxiliary glass stopper axially disposed in the first mentioned stopper and provided with an integral glass bent pipe extending downwardly into the chamber of the casing. The auxiliary stopper having a ground seat as well as the first mentioned stopper.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the upper portion of the bottle.

Figure 2 is a vertical sectional view through the bottle.

Figure 3 is a horizontal sectional view taken on line 3—3 of Figure 2.

Figure 4 is a horizontal sectional view taken on line 4—4 of Figure 2.

Figure 5 is a modified form of stopper and filter carried by a conventional form of stopper.

Figure 6 is a sectional view through another modification, showing the device applied to a stopper of the type used in carboys.

Referring to the drawings, the numeral 1 designates a bottle and 2 a faucet adjacent the lower end thereof, by means of which the liquid 3 within the bottle may be withdrawn. Extending upwardly from the upper end of the bottle 1 is a bottle neck 4, which bottle neck is provided with a tapered ground stopper receiving seat 5, for the reception of the tapered ground main stopper 6. The stopper 6 is provided with a downwardly extending integral casing 7, which forms a filter receiving chamber 8, the filter being formed by a liquid 9 within the chamber. The casing 7 extends into the liquid 3 and at a point above the liquid level is provided with an aperture 10 through which air passes after passing through the filter liquid 9, thereby thoroughly filtering the air before it comes into contact with the liquid 3. The main stopper 6 is provided with a tapered ground seat 11, which receives a tapered ground auxiliary stopper 12, which stopper is provided with a downwardly extending integral tubular member 13, the lower end of which extends into the filter liquid 9. As the liquid 3 is displaced, air passes downwardly through the stopper 12, tubular member 13, and thence through the filter liquid 9 where it is thoroughly filtered and cleansed after which it passes through the aperture 10 through the interior of the bottle. It will be seen that the air is thoroughly filtered and that the liquid 9 forms a seal at all times for protecting the liquid 3 from the atmosphere and consequently from deterioration, thereby when the bottle is filled with distilled water, organisms in the air are kept out and where acid, such for instance as sulphuric and nitric, moisture is kept out of the bottle. It is obvious that by removing the stopper 12 that the chamber 8 may be easily and quickly filled. The liquid 9 may be the same as the liquid 3 or and other kind of liquid.

Referring to Figure 5 wherein a modified form is shown, the casing 7 is formed separable from the stopper 14, which stopper may be formed from cork or any other material and is provided with a vent pipe 13ª extending downwardly into the chamber 8.

Referring to Figure 6 wherein a further modification is shown the stopper 15 may be formed of any material, however it is preferably of acid resisting type such for instance as the type used in carboys and provided with a downwardly extending extension 16 which receives the upper end 17 of the casing 7, and with a vent pipe 13ᵇ which extends through the stopper and through the extension 16 into the liquid 9. The form set forth in Figure 6 is particularly adapted for use in connection with stoppers of carboys and may be provided with a siphon pipe 18, whereby liquid within the container may be removed.

From the above it will be seen that a filtering attachment for stoppers is provided, which is simple in construction, the parts reduced to a minimum and so constructed that air will be thoroughly filtered before entering the container.

The invention having been set forth what is claimed as new and useful is:—

The combination with a liquid receptacle, means for drawing liquid from said receptacle, a main stopper carried by said receptacle and having a ground seat connection with the receptacle, an auxiliary stopper disposed within the main stopper and having a ground seat connection therewith, a downwardly extending casing carried by the main stopper and having a liquid receiving chamber therein in communication with the chamber of the receptacle through an aperture adjacent the upper end of the casing, an integral pipe carried by the auxiliary stopper and extending downwardly, axially into the chamber of the casing, said pipe being in communication with the atmosphere through the auxiliary stopper.

In testimony whereof I hereunto affix my signature.

HARLOWE M. SIMPSON.